US012737312B2

(12) United States Patent
Liu et al.

(10) Patent No.: US 12,737,312 B2
(45) Date of Patent: Sep. 15, 2026

(54) NETWORK CARD DEVICE AND DATA TRANSMISSION SYSTEM

(71) Applicant: IEIT SYSTEMS (Beijing) Co., Ltd., Beijing (CN)

(72) Inventors: Wei Liu, Beijing (CN); Yanmei Shen, Beijing (CN); Dongdong Su, Beijing (CN); Yanwei Wang, Beijing (CN); Wei Huang, Beijing (CN)

(73) Assignee: IEIT SYSTEMS (BEIJING) CO., LTD., Beijing (CN)

( * ) Notice: Subject to any disclaimer, the term of this patent is extended or adjusted under 35 U.S.C. 154(b) by 0 days.

(21) Appl. No.: 19/168,760

(22) PCT Filed: Nov. 26, 2024

(86) PCT No.: PCT/CN2024/134577

§ 371 (c)(1),
(2) Date: Sep. 24, 2025

(87) PCT Pub. No.: WO2025/113441

PCT Pub. Date: Jun. 5, 2025

(65) Prior Publication Data

US 2026/0111376 A1 Apr. 23, 2026

(30) Foreign Application Priority Data

Nov. 29, 2023 (CN) ........................ 202311616379.4

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ............................ G06F 13/28; G06F 2213/28
See application file for complete search history.

(56) References Cited

U.S. PATENT DOCUMENTS 8,943,240 B1 * 1/2015 Subramanian .......... G06F 13/28 710/28
2010/0175073 A1 7/2010 Hu
(Continued)

FOREIGN PATENT DOCUMENTS

CN 109558344 A 4/2019
CN 113535395 A 10/2021
(Continued)

OTHER PUBLICATIONS

The search report of counterpart PCT application No. PCT/CN2024/134577 was issued on Mar. 5, 2025.
(Continued)

*Primary Examiner* — Henry Tsai
*Assistant Examiner* — Harry Z Wang
(74) *Attorney, Agent, or Firm* — Scully, Scott, Murphy & Presser, P.C.

(57) ABSTRACT

Provided are a network card device and a data transmission system. The network card device includes a storage module; a descriptor queue address register; a compute express link hard core module, configured to transmit data sent by a host to a first data storage area, transmit a descriptor sent by the host to a first descriptor storage area, and transmit a trigger instruction sent by the host to a network data processing module; and the network data processing module, configured to acquire a base address from the descriptor queue address register in response to the trigger instruction being received, read a target descriptor in the first descriptor storage area based on the base address and the trigger instruction, read target data corresponding to the target descriptor from the first data storage area, and output the target data to a network.

20 Claims, 5 Drawing Sheets

(56) References Cited

U.S. PATENT DOCUMENTS

| | | | | |
|---|---|---|---|---|
| 2011/0153877 | A1* | 6/2011 | King | G06F 13/28 710/26 |
| 2019/0243781 | A1* | 8/2019 | Thyamagondlu | G06F 13/28 |
| 2019/0377704 | A1* | 12/2019 | Pope | G06F 13/385 |
| 2024/0007295 | A1* | 1/2024 | Miyamoto | H04L 9/0891 |
| 2024/0411700 | A1* | 12/2024 | Halaharivi | G06F 12/10 |
| 2025/0004639 | A1* | 1/2025 | Sawal | G06F 3/0631 |
| 2025/0023808 | A1* | 1/2025 | Riddoch | G06F 13/128 |

FOREIGN PATENT DOCUMENTS

| | | | |
|---|---|---|---|
| CN | 116069256 | A | 5/2023 |
| CN | 116521589 | A | 8/2023 |
| CN | 117648264 | A | 3/2024 |

OTHER PUBLICATIONS

The first search report of counterpart CN application No. 202311616379.4 issued on Aug. 25, 2025.

Zheng, Kai.;"The Design of DMA in High peed NIC Based on PCI Express 2.0"; "Computer Engineering & Softerware". Aug. 15, 2017 (Aug. 15, 2017). vol 38, No. 8.

* cited by examiner

NETWORK CARD DEVICE AND DATA TRANSMISSION SYSTEM

CROSS-REFERENCE TO RELATED APPLICATIONS

This disclosure is a National Stage Entry under 35 U.S.C. § 371 of PCT International Application No. PCT/CN2024/134577, filed on Nov. 26, 2024, which claims priority to Chinese Patent Application No. 202311616379.4, filed to the China National Intellectual Property Administration on Nov. 29, 2023 and entitled "Network Card Device and Data Transmission System", the entire contents of each of which are incorporated herein by reference for all purposes.

TECHNICAL FIELD

The present disclosure relates to the field of data processing, and in particular, to a network card device and a data transmission system.

BACKGROUND

As a device that requires high-speed data processing, a network card is generally connected to a Central Processing Unit (CPU) of a host through a Peripheral Component Interconnect Express (PCIe) bus. In the process of performing data transmission through the network card, data may be first written into a host memory by the CPU of the host, then read from the host memory to the inside of the network card by the network card through a PCIe link, and then sent to a network by the network card. As a result, each data transmission may involve two accesses to the host memory, occupying the access bandwidth of the host memory. In addition, the host memory is shared by a plurality of CPU cores, and excessive occupation of the memory access bandwidth by a processor core or device may affect the performance of other cores.

Therefore, how to provide a solution to the above technical problems is a problem to be solved by those skilled in the art at present.

SUMMARY

An objective of the present disclosure is to provide a network card device and a data transmission system, which can reserve the access bandwidth of a host memory for other functions running on a host to use, so that the overall operation efficiency of the host is improved.

In order to solve the above technical problem, the present disclosure provides a network card device, including:

- a storage module, the storage module includes a first descriptor storage area and a first data storage area;
- a descriptor queue address register, configured to store a base address of the first descriptor storage area;
- a compute express link hard core module, configured to receive data and a descriptor sent by a host through a compute express link memory protocol, receive a trigger instruction sent by the host through a compute express link enumeration configuration protocol, transmit the data sent by the host to the first data storage area, transmit the descriptor sent by the host to the first descriptor storage area, and transmit the trigger instruction sent by the host to the network data processing module;
- a network data processing module, configured to acquire the base address from the descriptor queue address register in response to the trigger instruction being received, read a target descriptor in the first descriptor storage area based on the base address and the trigger instruction, read target data corresponding to the target descriptor from the first data storage area, and output the target data to a network.

In some exemplary embodiments, the network card device further includes:

- a direct memory access module, configured to read the target descriptor from the first descriptor storage area based on a received read address, read the target data corresponding to the target descriptor from the first data storage area, and send the target data to the network data processing module;
- the network data processing module, configured to acquire the base address from the descriptor queue address register in response to the trigger instruction being received, calculate the received read addresss of the target descriptor based on the base address and the trigger instruction, send the received read addresss to the direct memory access module, acquire the target data sent by the direct memory access module, and output the target data to the network.

In some exemplary embodiments, acquire the target data sent by the direct memory access module and outputting the target data to the network includes:

- acquiring the target data sent by the direct memory access module;
- outputting the target data to the network when the target data meets an output condition.

In some exemplary embodiments, the output condition is that an actual length of the target data is consistent with a target length in the target descriptor.

In some exemplary embodiments, the trigger instruction includes a descriptor number;

- acquire the base address from the descriptor queue address register in response to the trigger instruction being received, read a target descriptor in the first descriptor storage area based on the base address and the trigger instruction includes:
- parsing the descriptor number in the trigger instruction in response to the trigger instruction being received, calculating a target address based on the descriptor number and the base address, and reading the target descriptor in the first descriptor storage area based on the target address.

In some exemplary embodiments, the base address includes a first flag bit, and the host memory of the host includes a second descriptor storage area and a second data storage area;

- the network data processing module, further configured to determine a target descriptor storage area and a target data storage area based on the first flag bit, to read the target descriptor from the target descriptor storage area and read the target data corresponding to the target descriptor from the target data storage area; wherein the target descriptor storage area is the first descriptor storage area or the second descriptor storage area, and the target data storage area is the first data storage area or the second data storage area.

The process of acquire the base address from the descriptor queue address register in response to the trigger instruction being received, read a target descriptor in the first descriptor storage area based on the base address and the trigger instruction, read target data corresponding to the target descriptor from the first data storage area includes:

acquiring the base address from the descriptor queue address register in response to the trigger instruction being received, and when in response to determining the target descriptor storage area and the target data storage area are the first descriptor storage area and the first data storage area based on the first flag bit in the base address, the target descriptor in the first descriptor storage area is read based on the base address and the trigger instruction, and the target data corresponding to the target descriptor is read from the first data storage area.

In some exemplary embodiments, the network data processing module, further configured to acquire the base address from the descriptor queue address register in response to the trigger instruction being received, and in response to determining the target descriptor storage area and the target data storage area are the second descriptor storage area and the second data storage area based on the first flag bit in the base address, read the target descriptor in the second descriptor storage area based on the base address and the trigger instruction, and read the target data corresponding to the target descriptor from the second data storage area.

In some exemplary embodiments, the process of determine a target descriptor storage area and a target data storage area based on the first flag bit includes:

in response to the first flag bit being a first preset value, determining that the target descriptor storage area is the first descriptor storage area, and the target data storage area is the first data storage area; and in response to the first flag bit being a second preset value, determining that the target descriptor storage area is the second descriptor storage area, and the target data storage area is the second data storage area.

In some exemplary embodiments, the base address includes a first flag bit, the descriptor includes a second flag bit, and the host memory of the host includes a second descriptor storage area and a second data storage area;

the network data processing module, further configured to determine a target descriptor storage area and a target data storage area based on the first flag bit and the second flag bit, to read the target descriptor from the target descriptor storage area and read the target data corresponding to the target descriptor from the target data storage area; wherein the target descriptor storage area is the first descriptor storage area or the second descriptor storage area, and the target data storage area is the first data storage area or the second data storage area.

The process of acquire the base address from the descriptor queue address register in response to the trigger instruction being received, read a target descriptor in the first descriptor storage area based on the base address and the trigger instruction, read target data corresponding to the target descriptor from the first data storage area includes:

acquiring the base address from the descriptor queue address register in response to the trigger instruction being received, in response to determining the target descriptor storage area is the first descriptor storage area based on the first flag bit in the base address, reading the target descriptor in the first descriptor storage area based on the base address and the trigger instruction, and in response to determining the target data storage area is the first data storage area based on the second flag bit in the target descriptor, reading the target data corresponding to the target descriptor from the first data storage area.

In some exemplary embodiments, the network data processing module, further configured to acquire the base address from the descriptor queue address register in response to the trigger instruction being received, in response to determining the target descriptor storage area is the second descriptor storage area based on the first flag bit in the base address, read the target descriptor in the second descriptor storage area based on the base address and the trigger instruction, and in response to determining the target data storage area is the first data storage area based on the second flag bit in the target descriptor, read the target data corresponding to the target descriptor from the first data storage area.

In some exemplary embodiments, the network data processing module, further configured to acquire the base address from the descriptor queue address register in response to the trigger instruction being received, in response to determining the target descriptor storage area is the second descriptor storage area based on the first flag bit in the base address, read the target descriptor in the second descriptor storage area based on the base address and the trigger instruction, and in response to determining the target data storage area is the second data storage area based on the second flag bit in the target descriptor, read the target data corresponding to the target descriptor from the second data storage area.

In some exemplary embodiments, the network data processing module, further configured to acquire the base address from the descriptor queue address register in response to the trigger instruction being received, in response to determining the target descriptor storage area is the first descriptor storage area based on the first flag bit in the base address, read the target descriptor in the first descriptor storage area based on the base address and the trigger instruction, and in response to determining the target data storage area is the second data storage area based on the second flag bit in the target descriptor, read the target data corresponding to the target descriptor from the second data storage area.

In some exemplary embodiments, the process of determine a target descriptor storage area and a target data storage area based on the first flag bit and the second flag bit includes:

in response to the first flag bit being a first preset value, determining that the target descriptor storage area is the first descriptor storage area;

in response to the first flag bit being a second preset value, determining that the target descriptor storage area is the second descriptor storage area;

in response to the second flag bit being a third preset value, determining that the target data storage area is the first data storage area;

in response to the second flag bit being a fourth preset value, determining that the target data storage area is the second data storage area.

In some exemplary embodiments, the first preset value is identical to the third preset value, and the second preset value is identical to the fourth preset value.

In some exemplary embodiments, the descriptor includes a data address and a data length. The data address of the descriptor in the first descriptor storage area is a physical address inside the storage module, which is calculated based on a global physical address.

In some exemplary embodiments, the memory is a double data rate synchronous dynamic random access memory.

In some exemplary embodiments, the network card device further including:

- a memory mapping configuration module, configured to store the number of transmit/receive queues and the number of interrupts supported by the network data processing module;
- the compute express link hard core module, configured to transmit the number of transmit/receive queues and the number of interrupts to the host, to make the host partitions the first data storage area and the first descriptor storage area in the storage module based on the number of transmit/receive queues and the number of interrupts.

In some exemplary embodiments, the network card device further including:

- a mode enable register, configured to store a function trigger value;
- the compute express link hard core module, further configured to transmit the function trigger value sent by the host to the mode enable register;
- in response to the function trigger value being a fifth preset value, the network data processing module is disabled, and in response to the function trigger value being a sixth preset value, the network data processing module is enabled.

In order to solve the above technical problem, the present disclosure further provides a data transmission system, including:

- a host, configured to send data, a descriptor, and a trigger instruction;
- at least one network card device is described above.

In some exemplary embodiments, the host is further configured to perform an initialization operation on the network card device when connected to the network card device.

The present disclosure further provides the network card device, which includes the storage module, where the storage module includes the first descriptor storage area and the first data storage area; the descriptor queue address register, configured to store the base address of the first descriptor storage area; the compute express link hard core module, configured to receive the data and the descriptor sent by the host through the compute express link memory protocol, receive the trigger instruction sent by the host through the compute express link enumeration configuration protocol, transmit the data sent by the host to the first data storage area, transmit the descriptor sent by the host to the first descriptor storage area, and transmit the trigger instruction sent by the host to the network data processing module; and the network data processing module, configured to acquire the base address from the descriptor queue address register in response to the trigger instruction being received, read the target descriptor in the first descriptor storage area based on the base address and the trigger instruction, read the target data corresponding to the target descriptor from the first data storage area, and output the target data to the network.

In actual applications, by using the network card device of the present disclosure, the host may directly write the data and the descriptor corresponding to the data into the local storage module of the network card device through the compute express link hard core module. The network data processing module directly accesses the local storage module, reads the descriptor and the data, and sends the descriptor and the data to the network without accessing the host memory, to reserve the access bandwidth of the host memory for other functions running on the host to use, thereby improving the overall operation efficiency of the host.

The present disclosure further provides the data transmission system, which has the same beneficial effects as the above network card device.

BRIEF DESCRIPTION OF THE DRAWINGS

In order to more clearly illustrate the embodiments of the present disclosure, the drawings used in the embodiments will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

The core of the present disclosure is to provide a network card device and a data transmission system, which can reserve the access bandwidth of a host memory for other functions running on a host to use, so that the overall operation efficiency of the host is improved.

In order to make the objectives, solutions, and advantages of the embodiments of the present disclosure clearer, the solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art based on the embodiments of the present disclosure without creative efforts are within the scope of protection of the present disclosure.

In the present disclosure, each module and unit is a device component having functions, formed by at least one chip or circuit or component or a combination thereof.

Figure 1:
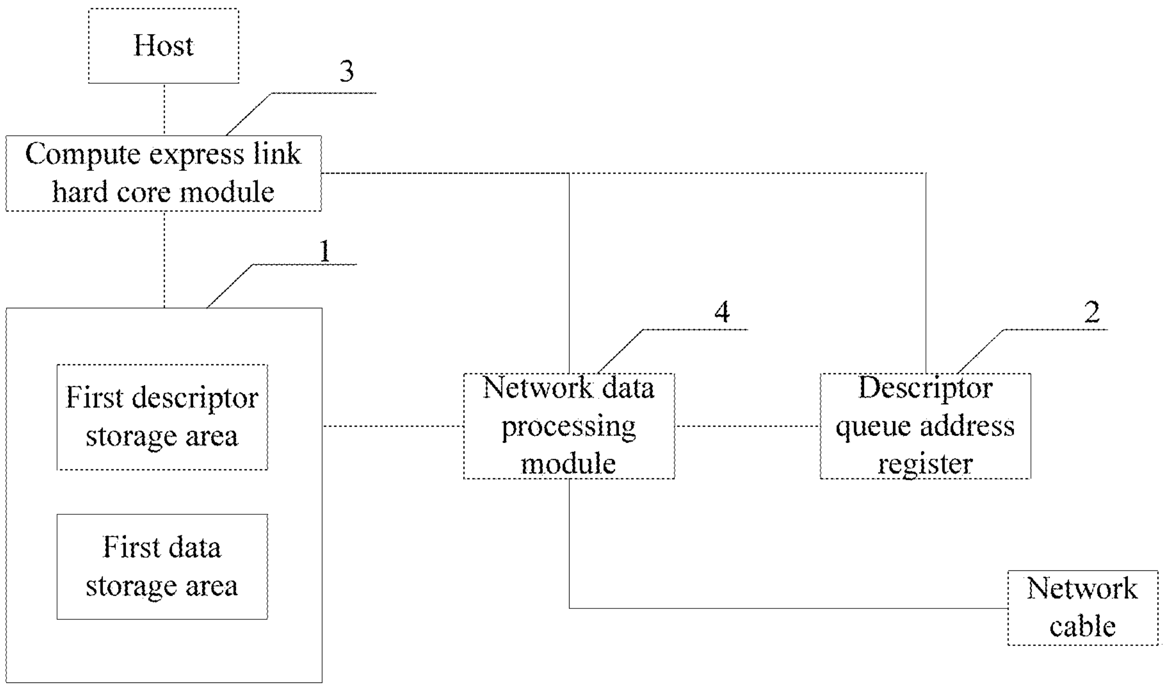
FIG. 1 is a schematic structural diagram of a network card device provided by the present disclosure.
Figure 2:
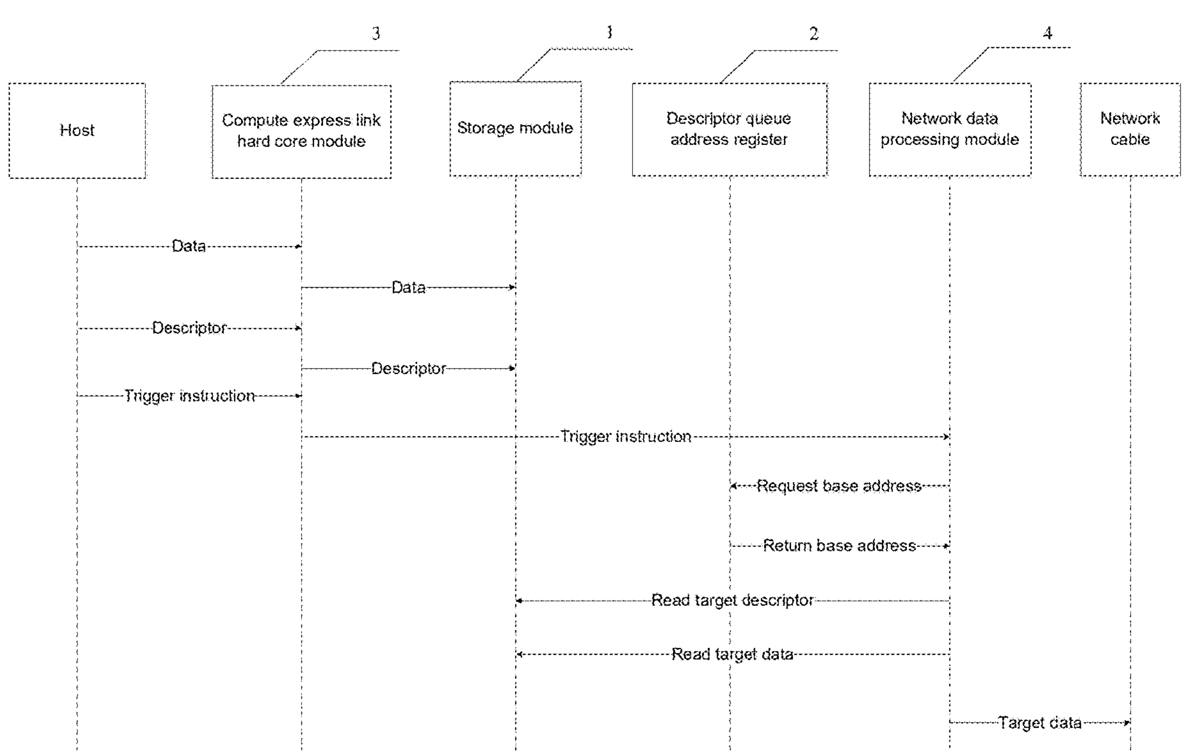
FIG. 2 is a schematic structural diagram of another network card device provided by the present disclosure.

In a first aspect, referring to FIG. 1 and FIG. 2, a network card device includes a storage module, a descriptor queue address register, a compute express link hard core module, and a network data processing module.

The storage module 1 includes a first descriptor storage area and a first data storage area.

The descriptor queue address register 2 is configured to store a base address of the first descriptor storage area.

The compute express link hard core module 3 is configured to receive data and a descriptor sent by a host through a compute express link memory protocol, receive a trigger instruction sent by the host through a compute express link enumeration configuration protocol, transmit the data sent by the host to the first data storage area, transmit the descriptor sent by the host to the first descriptor storage area, and transmit the trigger instruction sent by the host to the network data processing module 4.

The network data processing module 4 is configured to acquire the base address from the descriptor queue address register 2 in response to the trigger instruction being received, read a target descriptor in the first descriptor storage area based on the base address and the trigger instruction, read target data corresponding to the target descriptor from the first data storage area, and output the target data to a network.

It is understandable that the compute express link hard core module supporting a Compute Express Link (CXL, an open industry standard for high-bandwidth and low-latency device interconnection) protocol in the network card device is connected to the host through a PCIe bus, and the host may communicate with the CXL hard core module of the network card device through CXL.io and CXL.mem, wherein a CXL.io protocol is an enumeration configuration protocol mainly configured for device discovery and enumeration, error reporting, etc. Through the CXL.mem protocol, the host can access the device memory in the same manner as accessing the local memory. In the CXL.mem protocol, a CPU of the host, as a master device, is responsible for sending requests, while a device, as a slave device, returns responses. The requests are classified into data-carrying requests and data-free requests, and the responses are classified into data-carrying responses and data-free responses.

Before the data is transmitted through the network card device, the present embodiment further including: a segment of memory with a continuous physical address is allocated as the first descriptor storage area in the storage module 1 of the network card device through a network card driver on the host for storing a descriptor queue, and the base address of this segment of memory is written into the descriptor queue address register 2 of the network card device through the CXL hard core module 3. The descriptor queue includes at least one descriptor. For the same type of network card device, the data formats of the descriptors are identical. For different network card devices, the data formats of the descriptors may be the same or different. The descriptor includes at least two pieces of information, i.e., an address of the data storage area where the data to be sent is located and a data length.

When the data is transmitted through the network card, the network card driver of the host first applies for the first data storage area with a continuous physical address in the storage module 1 of the network card device, and writes the data to be sent into the first data storage area through the CXL hard core module 3. Then the network card driver of the host selects a descriptor, typically starting from the first descriptor sequentially, generates the trigger instruction based on the selected descriptor, and sends the trigger instruction to the network data processing module 4 in a network device through the CXL hard core module 3. After the trigger instruction is received, the network data processing module 4 calculates the address of the descriptor selected by the host in the first descriptor storage area based on the trigger instruction and the base address stored in the descriptor queue address register 2, reads the target descriptor from the first descriptor storage area based on the address of the descriptor, reads the corresponding target data from the first data storage area based on the data address and the data length corresponding to the target descriptor, and transmits the target data to the network. In the present embodiment, the CXL hard core module 3 writes the descriptor queue and data to be output into the local memory of the network card device in advance, so that the network data processing module 4 may directly access the local storage memory without accessing the host memory. On the one hand, the data transmission efficiency is improved, and on the other hand, the access bandwidth of the host memory can be reserved for other functions running on the host to use, so that the overall operation efficiency of the host is improved.

Figure 3:
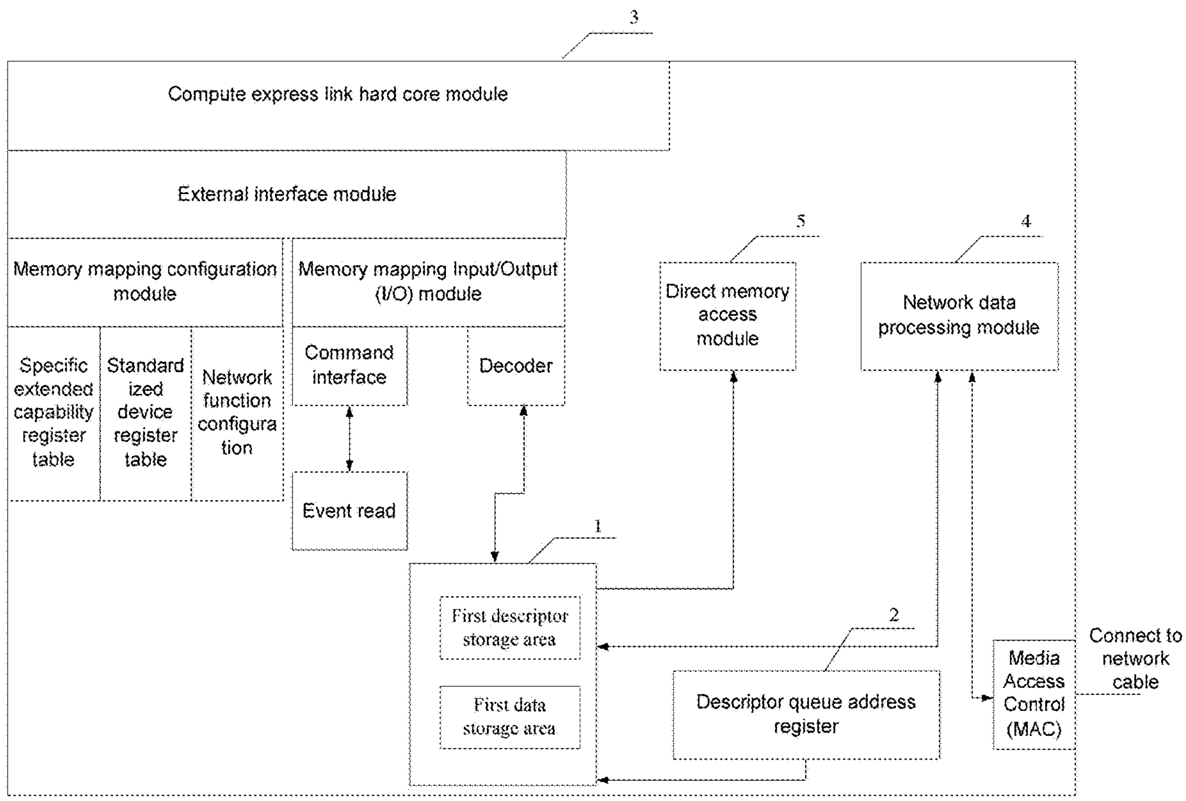
FIG. 3 is a schematic structural diagram of another network card device provided by the present disclosure.

Referring to FIG. 3, FIG. 3 is a schematic structural diagram of another network card device provided by the present disclosure. On the basis of the above embodiment, the network card device further includes:

an external interface module;

a memory mapping configuration module is configured to store CXL-supported Designated Vendor-Specific Extended Capability (DVSEC) tables (a set of register tables containing information such as the capacity and status of a CXL device), and Coherent Device Attribute Tables (CDATs) (standardized device register tables for reporting latency and bandwidth information, and network function configuration).

A memory mapping I/O module is part of the Peripheral Component Interconnect (PCI) (a computer bus standard) specification, and places I/O devices in memory space rather than I/O space.

The memory mapping I/O module is connected to a command interface and a Host-managed Device Memory (HDM) decoder. The command interface is configured to configure and manage the device and present partition information and event logs to software. The HDM decoder is configured to determine a mapping relationship between a Host Protected Area (HPA) and a Device Protected Area (DPA), and write corresponding data sent by the host into the corresponding address in the storage module 1.

One end of the MAC is connected to the network data processing module 4 while the other end thereof is connected to a network cable, so as to output the target data output by the network data processing module 4 to the network through the network cable.

It is understandable that the PCIe-supported CXL hard core module 3 is used in the present embodiment, and can be shared by a network data transmission function and an extended memory function of the network card device, thereby saving the logic resources of a Field Programmable Gate Array (FPGA) configured to construct the network card device.

It can be seen that, in the present embodiment, the host may directly write the data and the descriptor corresponding to the data into the local storage module 1 of the network card device through the CXL hard core module 3. The network data processing module 4 directly accesses the local storage module 1, reads the descriptor and the data, and sends the descriptor and the data to the network without accessing the host memory, so as to reserve the access bandwidth of the host memory for other functions running on the host to use, thereby improving the overall operation efficiency of the host.

As some embodiments of the present disclosure, referring to FIG. 3, the network card device further includes:

a direct memory access module 5 is configured to read the target descriptor from the first descriptor storage area based on a received read address, read the target data corresponding to the target descriptor from the first data storage area, and send the target data to the network data processing module 4.

The network data processing module 4 is configured to acquire the base address from the descriptor queue address register 2 in response to the trigger instruction being received, calculate the received read addresss of the target descriptor based on the base address and the trigger instruction, send the received read addresss to the direct memory access module 5, acquire the target data sent by the direct memory access module 5, and output the target data to the network.

As some embodiments of the present disclosure, the process of acquire the target data sent by the direct memory access module 5 and output the target data to the network includes:

The target data sent by the direct memory access module 5 is acquired.

The target data is output to the network when the target data meets an output condition.

As some embodiments of the present disclosure, the output condition is that an actual length of the target data is consistent with a target length in the target descriptor.

In the present embodiment, the network card device further includes the direct memory access module 5. After determining the received read address of the target descriptor, the network data processing module 4 may send the received read addresss to the direct memory access module 5. The direct memory access module 5 performs data transfer in the local memory to transfer the target data corresponding to the target descriptor to the network data processing module 4. When determining that the length of the target data sent by the direct memory access module 5 is consistent with the data length of the target descriptor, the network data processing module 4 sends the target data to the network. By performing a data transfer task through the direct memory access module 5, the network data processing module 4 can handle other tasks, thereby improving the operation efficiency of the network card device.

As some embodiments of the present disclosure, the trigger instruction includes a descriptor number.

The process of acquire the base address from the descriptor queue address register 2 in response to the trigger instruction being received, and read the target descriptor in the first descriptor storage area based on the base address and the trigger instruction includes:

the descriptor number in the trigger instruction is parsed in response to the trigger instruction being received, a target address is calculated based on the descriptor number and the base address, and the target descriptor in the first descriptor storage area is read based on the target address.

In the present embodiment, the descriptor number is configured to determine the descriptor to be processed currently selected by the host. Assuming that an N-th descriptor in the descriptor queue is selected, the descriptor number is N. After receiving the descriptor number, the network data processing module 4 calculates the address where the Nt-h descriptor is located, i.e., the target address, based on the base address of the descriptor queue plus N multiplied by the length of each descriptor.

Figure 4:
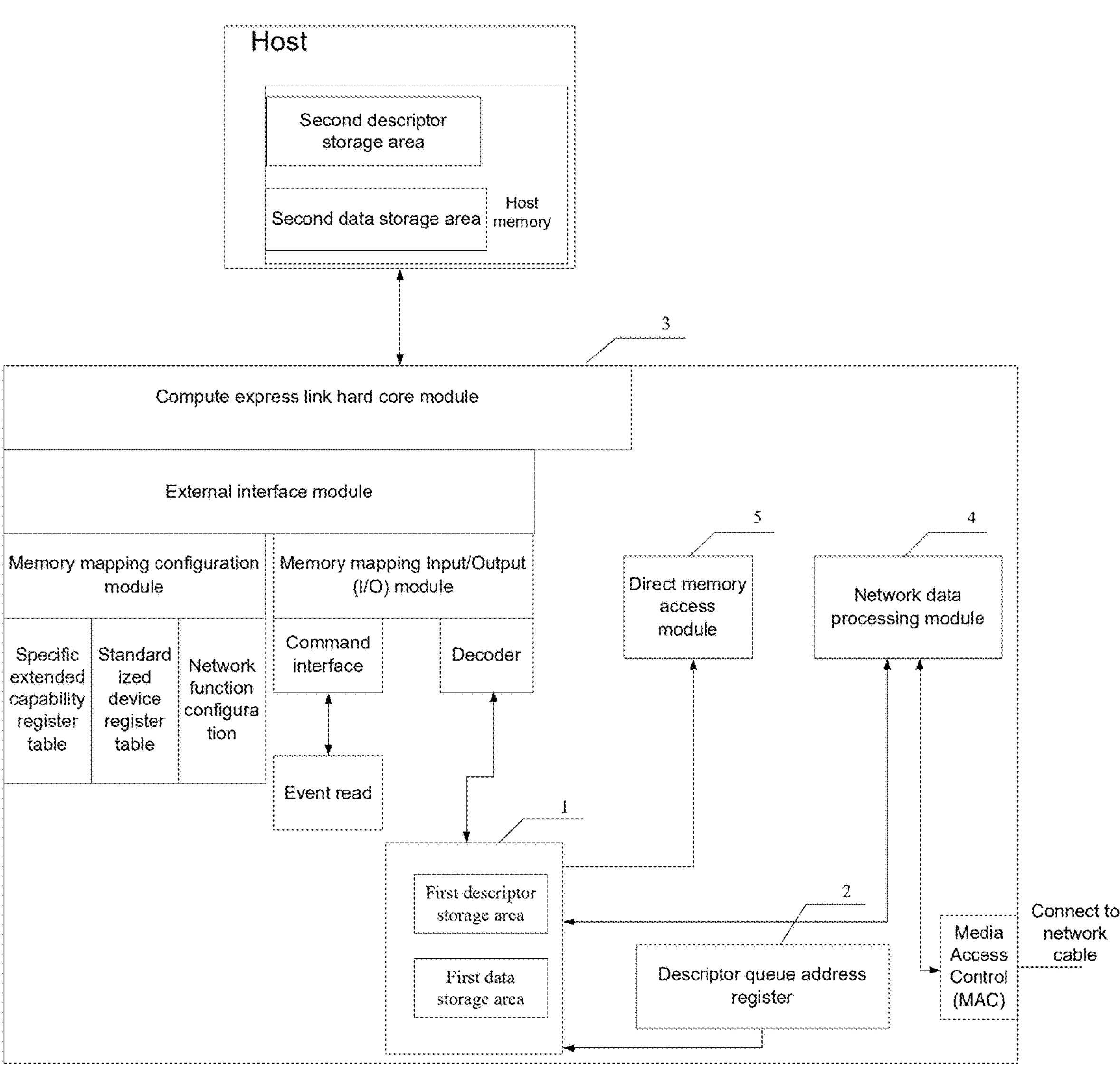
FIG. 4 is a schematic structural diagram of another network card device provided by the present disclosure.

Referring to FIG. 4, as some embodiments of the present disclosure, the base address includes a first flag bit, and the host memory of the host includes a second descriptor storage area and a second data storage area.

The network data processing module 4 is further configured to determine a target descriptor storage area and a target data storage area based on the first flag bit, so as to read the target descriptor from the target descriptor storage area and read the target data corresponding to the target descriptor from the target data storage area. The target descriptor storage area is the first descriptor storage area or the second descriptor storage area, and the target data storage area is the first data storage area or the second data storage area.

As some embodiments of the present disclosure, the process of acquire the base address from the descriptor queue address register 2 in response to the trigger instruction being received, read the target descriptor in the first descriptor storage area based on the base address and the trigger instruction, and read the target data corresponding to the target descriptor from the first data storage area includes:

The base address is acquired from the descriptor queue address register 2 in response to the trigger instruction being received, and in response to determining the target descriptor storage area and the target data storage area are the first descriptor storage area and the first data storage area based on the first flag bit in the base address, the target descriptor in the first descriptor storage area is read based on the base address and the trigger instruction, and the target data corresponding to the target descriptor is read from the first data storage area.

As some embodiments of the present disclosure, the network data processing module 4 is further configured to acquire the base address from the descriptor queue address register 2 in response to the trigger instruction being received, and in response to determining the target descriptor storage area and the target data storage area are the second descriptor storage area and the second data storage area based on the first flag bit in the base address, read the target descriptor in the second descriptor storage area based on the base address and the trigger instruction, and read the target data corresponding to the target descriptor from the second data storage area.

As some embodiments of the present disclosure, the process of determine the target descriptor storage area and the target data storage area based on the first flag bit includes:

in response to the first flag bit being a first preset value, it is determined that the target descriptor storage area is the first descriptor storage area, and the target data storage area is the first data storage area.

In response to the first flag bit being a second preset value, it is determined that the target descriptor storage area is the second descriptor storage area, and the target data storage area is the second data storage area.

In order to avoid the network card device from reading the descriptor and the data to be transmitted from the host memory through the PCIe bus, in the present embodiment, the base address is provided with the first flag bit, and based on the value of the first flag bit, it may be determined whether the descriptor queue is stored in the host memory or the local memory of the network card device. When the value of the first flag bit is the first preset value, the descriptor queue and the data to be transmitted are both stored in the local memory of the network card device. When the value of the first flag bit is the second preset value, the descriptor queue and the data to be transmitted are both stored in the host memory of the network card device.

It is understandable that the descriptor queue and the data to be transmitted are stored in the host memory of the network card device, and then the network data processing module 4 transfers the data from the host memory through the direct memory access module 5. The transfer process refers to the above process and will not be elaborated herein.

Referring to FIG. 4, as some embodiments of the present disclosure, the base address includes a first flag bit, the descriptor includes a second flag bit, and the host memory of the host includes a second descriptor storage area and a second data storage area.

The network data processing module 4 is further configured to determine a target descriptor storage area and a target data storage area based on the first flag bit and the second flag bit, to read the target descriptor from the target descriptor storage area and read the target data corresponding to the target descriptor from the target data storage area. The target descriptor storage area is the first descriptor storage area or the second descriptor storage area, and the target data storage area is the first data storage area or the second data storage area.

As some embodiments of the present disclosure, the process of acquire the base address from the descriptor queue address register 2 in response to the trigger instruction being received, read the target descriptor in the first descriptor storage area based on the base address and the trigger instruction, and read the target data corresponding to the target descriptor from the first data storage area includes the following operation.

The base address is acquired from the descriptor queue address register 2 in response to the trigger instruction being received, in response to determining the target descriptor storage area is the first descriptor storage area based on the first flag bit in the base address, the target descriptor in the first descriptor storage area is read based on the base address and the trigger instruction, and in response to determining the target data storage area is the first data storage area based on the second flag bit in the target descriptor, the target data corresponding to the target descriptor is read from the first data storage area.

As some embodiments of the present disclosure, the network data processing module 4 is further configured to acquire the base address from the descriptor queue address register 2 in response to the trigger instruction being received, in response to determining the target descriptor storage area is the second descriptor storage area based on the first flag bit in the base address, read the target descriptor in the second descriptor storage area based on the base address and the trigger instruction, and in response to determining the target data storage area is the first data storage area based on the second flag bit in the target descriptor, read the target data corresponding to the target descriptor from the first data storage area.

As some embodiments of the present disclosure, the network data processing module 4 is further configured to acquire the base address from the descriptor queue address register 2 in response to the trigger instruction being received, in response to determining the target descriptor storage area is the second descriptor storage area based on the first flag bit in the base address, read the target descriptor in the second descriptor storage area based on the base address and the trigger instruction, and in response to determining the target data storage area is the second data storage area based on the second flag bit in the target descriptor, read the target data corresponding to the target descriptor from the second data storage area.

As some embodiments of the present disclosure, the network data processing module 4 is further configured to acquire the base address from the descriptor queue address register 2 in response to the trigger instruction being received, in response to determining the target descriptor storage area is the first descriptor storage area based on the first flag bit in the base address, read the target descriptor in the first descriptor storage area based on the base address and the trigger instruction, and in response to determining the target data storage area is the second data storage area based on the second flag bit in the target descriptor, read the target data corresponding to the target descriptor from the second data storage area.

As some embodiments of the present disclosure, the process of determine the target descriptor storage area and the target data storage area based on the first flag bit and the second flag bit includes:

- in response to the first flag bit being a first preset value, it is determined that the target descriptor storage area is the first descriptor storage area;
- in response to the first flag bit being a second preset value, it is determined that the target descriptor storage area is the second descriptor storage area;
- in response to the second flag bit being a third preset value, it is determined that the target data storage area is the first data storage area;
- in response to the second flag bit being a fourth preset value, it is determined that the target data storage area is the second data storage area.

As some embodiments of the present disclosure, the first preset value is identical to the third preset value, and the second preset value is identical to the fourth preset value.

In the present embodiment, in addition to providing the first flag bit in the base address, the descriptor is further provided with the second flag bit, and based on the values of the first flag bit and the second flag bit, it may be determined that the descriptor queue and the data to be transmitted are stored in the local memory and/or the host memory. Assuming that the first flag bit in the base address is the first preset value and the second flag bit in the descriptor is the third preset value, the target descriptor and the data to be transmitted are read from the local memory. Assuming that the first flag bit in the base address is the second preset value and the second flag bit in the descriptor is the fourth preset value, the target descriptor and the data to be transmitted are read from the host memory through the direct memory access module 5. Assuming that the first flag bit in the base address is the first preset value and the second flag bit in the descriptor is the third preset value, the target descriptor is read from the local memory and the data to be transmitted is read from the host memory through the direct memory access module 5. Assuming that the first flag bit in the base address is the second preset value and the second flag bit in the descriptor is the third preset value, the target descriptor is read from the host memory through the direct memory access module 5 and the data to be transmitted is read from the local memory.

As some embodiments of the present disclosure, the descriptor includes a data address and a data length. The data address of the descriptor in the first descriptor storage area is a physical address inside the storage module 1, which is calculated based on a global physical address.

When the network card driver writes the address of a data buffer into the descriptor queue, the driver needs to write the physical address inside the device, which is calculated from the global physical address, so that the network data processing module 4 in the device can access the local memory device.

As some embodiments of the present disclosure, the storage memory 1 is a DDR synchronous dynamic random access memory.

As some embodiments of the present disclosure, the network card device further includes a memory mapping configuration module.

The memory mapping configuration module is configured to store the number of transmit/receive queues and the number of interrupts supported by the network data processing module 4.

The CXL hard core module 3 is configured to transmit the number of transmit/receive queues and the number of interrupts to the host, so that the host partitions the first data storage area and the first descriptor storage area in the storage module 1 based on the number of transmit/receive queues and the number of interrupts.

As some embodiments of the present disclosure, the network card device further includes a mode enable register.

The mode enable register is configured to store a function trigger value.

The CXL hard core module 3 is further configured to transmit the function trigger value sent by the host to the mode enable register.

In response to the function trigger value being a fifth preset value, the network data processing module 4 is disabled, and in response to the function trigger value being a sixth preset value, the network data processing module 4 is enabled.

It is understandable that the network card device in the present embodiment may simultaneously implement the extended memory function and the network data transmission function, or may separately implement the extended memory function or separately implement the network data transmission function. By providing the mode enable register in the network card device, the host writes different values into the mode enable register to enable or disable different functions of the network card device. For an operating system of the host, when the network card device is used as a CXL extended memory, only an existing CXL driver module is loaded without loading any network card driver. When the network card device is used as an ordinary network card, it is necessary to avoid loading the relevant CXL driver (or to set the device to be invalid after loading the driver), and only load the network card driver.

In summary, in the device that supports the CXL extended memory and network card functions in the present disclosure, one of the functions may be used separately by software configuration, or the functions may be used simultaneously, so that the utilization rate of the device is improved and the purchase cost of the device is reduced. When the network card device of the present disclosure uses the network card function to send and receive network data, an allocated descriptor list and data buffer are located in a DDR chip of the device (which is added to the operating system as the CXL extended memory), thereby avoiding frequent access to the host memory, freeing up the bandwidth of the host memory to other processor cores, and improving the overall operation efficiency of the system.

Figure 5:
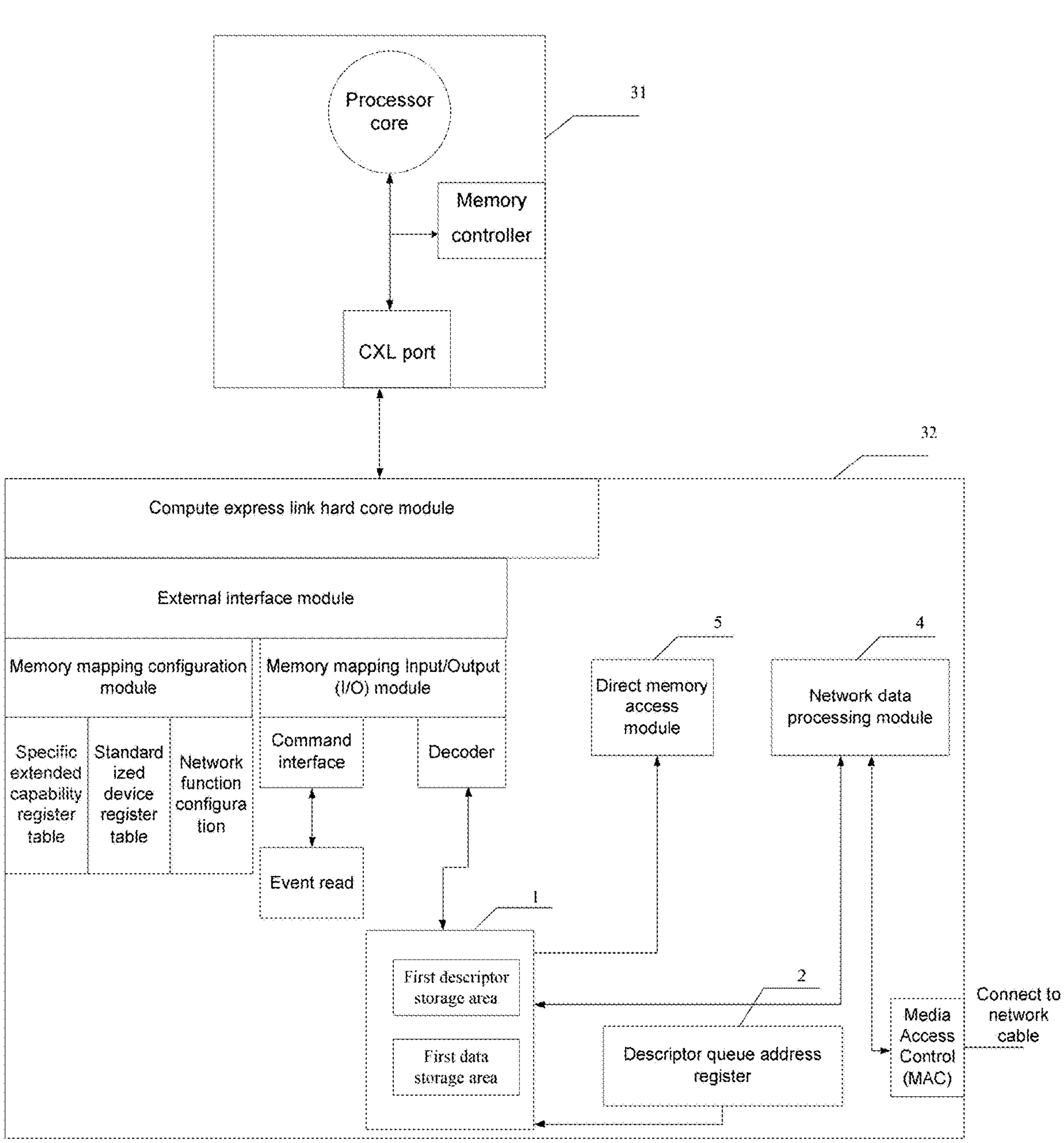
FIG. 5 is a schematic structural diagram of a data transmission system provided by the present disclosure.

In a second aspect, referring to FIG. 5, FIG. 5 is a schematic structural diagram of a data transmission system provided by the present disclosure. The data transmission system includes a host 31 and at least one network card device 32.

The host 31 is configured to send data, a descriptor, and a trigger instruction.

The at least one network card device 32 is described above.

As some embodiments of the present disclosure, the host 31 is further configured to perform an initialization operation on the network card device 32 when connected to the network card device 32.

The host 31 includes a CXL port, a memory controller, and a processor core. After a CXL hard core module of the network card device 32 is normally connected to the CXL port of the host 31 through a PCIe bus supporting a CXL protocol, and an initialization operation is performed on a Linux operating system of the host 31, including creating a Non Uniform Memory Access (NUMA) node, and providing a CXL extended memory and a network card (as a PCIe device) on the NUMA node. In the data sending process, when an operating system network protocol stack applies for a memory (to store data) for the network card, a physical memory belonging to the same NUMA node may be automatically allocated. According to the design of the present disclosure, the physical memory is the CXL extended memory (located on the same device as the network card). When a network card driver is written, whether the memory is applied for the descriptor or a buffer is applied for the received data, it is necessary to ensure that the applied physical memory and the network card belong to the same NUMA node. In order to avoid the network card from still reading the descriptor and the data buffer from the host 31 memory through the PCIe bus as in the ordinary solution, it is necessary to set a flag bit negotiated in advance by software and hardware in each descriptor, and the software sets the hardware to read the flag bit to ensure that the network card hardware directly accesses the memory chip (DDR) inside the device. When acquiring the network card configuration (such as the number of queues), the network card driver no longer reads the configuration from the ordinary PCIe configuration space, but reads from a CXL.io configuration space. When the network card driver writes an address of the data buffer into the descriptor, the driver needs to write a physical address inside the device, which is calculated from a global physical address, so that the network processing logic in the device can access the device memory.

For scenarios that use a Data Plane Development Kit (DPDK) (a set of software libraries and drivers) network instead of a Linux (an operating system kernel) network driver to implement the solution, the initialization operation includes reserving a huge page in the system to ensure that the huge page and the device belong to the same NUMA node. That is, when applying for the huge page, an application uses the memory extended by a CXL device in the future. The DPDK is set in parameters during startup to use the huge page when applying for the memory and the descriptor. When a DPDK driver is written, the second item is supported. When the DPDK driver is written and the address of the data buffer in the descriptor is written, it is necessary to write the physical address inside the device, which is calculated from the global physical address, so that the network processing logic in the device can access the device memory.

The network card device 32 includes:

- a storage module, the storage module includes a first descriptor storage area and a first data storage area;
- a descriptor queue address register is configured to store a base address of the first descriptor storage area;
- a CXL hard core module is configured to transmit the data sent by the host 31 to the first data storage area, transmit the descriptor sent by the host 31 to the first descriptor storage area, and transmit the trigger instruction sent by the host 31 to the network data processing module;
- a network data processing module is configured to acquire the base address from the descriptor queue address register in response to the trigger instruction being received, read a target descriptor in the first descriptor storage area based on the base address and the trigger instruction, read target data corresponding to the target descriptor from the first data storage area, and output the target data to a network.

As some embodiments of the present disclosure, the network card device 32 further includes a direct memory access module.

The direct memory access module is configured to read the target descriptor from the first descriptor storage area based on a received read address, read the target data corresponding to the target descriptor from the first data storage area, and send the target data to the network data processing module.

The network data processing module is configured to acquire the base address from the descriptor queue address register in response to the trigger instruction being received, calculate the received read addresss of the target descriptor based on the base address and the trigger instruction, send the received read addresss to the direct memory access module, acquire the target data sent by the direct memory access module, and output the target data to the network.

As some embodiments of the present disclosure, the process of acquire the target data sent by the direct memory access module and output the target data to the network includes:

the target data sent by the direct memory access module is acquired;

the target data is output to the network when the target data meets an output condition.

As some embodiments of the present disclosure, the output condition is that an actual length of the target data is consistent with a target length in the target descriptor.

As some embodiments of the present disclosure, the trigger instruction includes a descriptor number.

The process of acquire the base address from the descriptor queue address register in response to the trigger instruction is received, and read the target descriptor in the first descriptor storage area based on the base address and the trigger instruction includes:

the descriptor number in the trigger instruction is parsed in response to the trigger instruction being received, a target address is calculated based on the descriptor number and the base address, and the target descriptor in the first descriptor storage area is read based on the target address.

As some embodiments of the present disclosure, the base address includes a first flag bit, and a host memory of the host 31 includes a second descriptor storage area and a second data storage area.

The network data processing module is further configured to determine a target descriptor storage area and a target data storage area based on the first flag bit. The target descriptor storage area is the first descriptor storage area or the second descriptor storage area, and the target data storage area is the first data storage area or the second data storage area.

The process of acquire the base address from the descriptor queue address register in response to the trigger instruction being received, read the target descriptor in the first descriptor storage area based on the base address and the trigger instruction, and read the target data corresponding to the target descriptor from the first data storage area includes:

the base address is acquired from the descriptor queue address register in response to the trigger instruction being received, and in response to determining the target descriptor storage area and the target data storage area are the first descriptor storage area and the first data storage area based on the first flag bit in the base address, the target descriptor in the first descriptor storage area is read based on the base address and the trigger instruction, and the target data corresponding to the target descriptor is read from the first data storage area.

As some embodiments of the present disclosure, the network data processing module is further configured to acquire the base address from the descriptor queue address register in response to the trigger instruction is received, and in response to determining the target descriptor storage area and the target data storage area are the second descriptor storage area and the second data storage area based on the first flag bit in the base address, read the target descriptor in the second descriptor storage area based on the base address and the trigger instruction, and read the target data corresponding to the target descriptor from the second data storage area.

As some embodiments of the present disclosure, the process of determine the target descriptor storage area and the target data storage area based on the first flag bit includes:

in response to the first flag bit being a first preset value, it is determined that the target descriptor storage area is the first descriptor storage area, and the target data storage area is the first data storage area;

in response to the first flag bit being a second preset value, it is determined that the target descriptor storage area is the second descriptor storage area, and the target data storage area is the second data storage area.

As some embodiments of the present disclosure, the base address includes a first flag bit, the trigger instruction includes a descriptor number, the descriptor number includes a second flag bit, and the host memory of the host 31 includes a second descriptor storage area and a second data storage area.

The network data processing module is further configured to determine a target descriptor storage area and a target data storage area according to the first flag bit and the second flag bit. The target descriptor storage area is the first descriptor storage area or the second descriptor storage area, and the target data storage area is the first data storage area or the second data storage area.

The process of acquire the base address from the descriptor queue address register in response to the trigger instruction is received, read the target descriptor in the first descriptor storage area based on the base address and the trigger instruction, and read the target data corresponding to the target descriptor from the first data storage area includes:

the base address is acquired from the descriptor queue address register in response to the trigger instruction being received, in response to determining the target descriptor storage area is the first descriptor storage area based on the first flag bit in the base address, the target descriptor in the first descriptor storage area is read based on the base address and the trigger instruction, and in response to determining the target data storage area is the first data storage area based on the second flag bit in the target descriptor, the target data corresponding to the target descriptor is read from the first data storage area.

As some embodiments of the present disclosure, the network data processing module is further configured to acquire the base address from the descriptor queue address register in response to the trigger instruction is received, in response to determining the target descriptor storage area is the second descriptor storage area based on the first flag bit in the base address, read the target descriptor in the second descriptor storage area based on the base address and the trigger instruction, and in response to determining the target data storage area is the first data storage area based on the second flag bit in the target descriptor, read the target data corresponding to the target descriptor from the first data storage area.

As some embodiments of the present disclosure, the network data processing module is further configured to acquire the base address from the descriptor queue address register in response to the trigger instruction being received, in response to determining the target descriptor storage area is the second descriptor storage area based on the first flag bit in the base address, read the target descriptor in the second descriptor storage area based on the base address and the trigger instruction, and in response to determining the target data storage area is the second data storage area based on the second flag bit in the target descriptor, read the target data corresponding to the target descriptor from the second data storage area.

As some embodiments of the present disclosure, the network data processing module is further configured to acquire the base address from the descriptor queue address register in response to the trigger instruction is received, in response to determining the target descriptor storage area is the first descriptor storage area based on the first flag bit in the base address, read the target descriptor in the first descriptor storage area based on the base address and the trigger instruction and in response to determining the target data storage area is the second data storage area based on the second flag bit in the target descriptor, read the target data corresponding to the target descriptor from the second data storage area.

As some embodiments of the present disclosure, the process of determine the target descriptor storage area and the target data storage area based on the first flag bit and the second flag bit includes:

in response to the first flag bit being a first preset value, it is determined that the target descriptor storage area is the first descriptor storage area;

in response to the first flag bit being a second preset value, it is determined that the target descriptor storage area is the second descriptor storage area; in response to the second flag bit being a third preset value, it is determined that the target data storage area is the first data storage area;

in response to the second flag bit being a fourth preset value, it is determined that the target data storage area is the second data storage area.

As some embodiments of the present disclosure, the first preset value is identical to the third preset value, and the second preset value is identical to the fourth preset value.

As some embodiments of the present disclosure, the descriptor includes a data address and a data length. The data address of the descriptor in the first descriptor storage area is the physical address inside the storage module, which is calculated based on the global physical address.

As some embodiments of the present disclosure, the storage memory is a DDR synchronous dynamic random access memory.

As some embodiments of the present disclosure, the network card device 32 further includes a direct memory access module.

The memory mapping configuration module is configured to store the number of transmit/receive queues and the number of interrupts supported by the network data processing module.

The CXL hard core module is configured to transmit the number of transmit/receive queues and the number of interrupts to the host 31, so that the host 31 partitions the first data storage area and the first descriptor storage area in the storage module 1 based on the number of transmit/receive queues and the number of interrupts.

As some embodiments of the present disclosure, the network card device 32 further includes a mode enable register.

The mode enable register is configured to store a function trigger value.

The CXL hard core module is further configured to transmit the function trigger value sent by the host 31 to the mode enable register.

In response to the function trigger value being a fifth preset value, the network data processing module is disabled, and in response to the function trigger value being a sixth preset value, the network data processing module is enabled.

It is also to be noted that relational terms "first", "second" and the like in the description are used only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The above description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but is within the widest scope consistent with the principles and novel features disclosed herein.

What is claimed is:

1. A network card device, comprising:

a storage module, the storage module comprises a first descriptor storage area and a first data storage area;

a descriptor queue address register, configured to store a base address of the first descriptor storage area;

a compute express link hard core module, configured to receive data and a descriptor sent by a host through a compute express link memory protocol, receive a trigger instruction sent by the host through a compute express link enumeration configuration protocol, transmit the data sent by the host to the first data storage area, transmit the descriptor sent by the host to the first descriptor storage area, and transmit the trigger instruction sent by the host to a network data processing module; and the network data processing module, configured to acquire the base address from the descriptor queue address register in response to the trigger instruction being received, read a target descriptor in the first descriptor storage area based on the base address and the trigger instruction, read target data corresponding to the target descriptor from the first data storage area, and output the target data to a network.

2. The network card device as claimed in claim 1, the network card device further comprising:

a direct memory access module, configured to read the target descriptor from the first descriptor storage area based on a received read address, read the target data corresponding to the target descriptor from the first data storage area, and send the target data to the network data processing module;

the network data processing module, configured to acquire the base address from the descriptor queue address register in response to the trigger instruction being received, calculate the received read address of the target descriptor based on the base address and the trigger instruction, send the received read address to the direct memory access module, acquire the target data sent by the direct memory access module, and output the target data to the network.

3. The network card device as claimed in claim 2, wherein acquire the target data sent by the direct memory access module, and output the target data to the network comprises:

acquiring the target data sent by the direct memory access module; and outputting the target data to the network when the target data meets an output condition.

4. The network card device as claimed in claim 3, wherein the output condition is that an actual length of the target data is consistent with a target length in the target descriptor.

5. The network card device as claimed in claim 1, wherein the trigger instruction comprises a descriptor number;

acquire the base address from the descriptor queue address register in response to the trigger instruction being received, read a target descriptor in the first descriptor storage area based on the base address and the trigger instruction comprises:

parsing the descriptor number in the trigger instruction in response to the trigger instruction being received, calculating a target address based on the descriptor number and the base address, and reading the target descriptor in the first descriptor storage area based on the target address.

6. The network card device as claimed in claim 1, wherein the base address comprises a first flag bit, and a host memory of the host comprises a second descriptor storage area and a second data storage area;

the network data processing module, further configured to determine a target descriptor storage area and a target data storage area based on the first flag bit, to read the target descriptor from the target descriptor storage area and read the target data corresponding to the target descriptor from the target data storage area, wherein the target descriptor storage area is the first descriptor storage area or the second descriptor storage area, and the target data storage area is the first data storage area or the second data storage area.

7. The network card device as claimed in claim 6, wherein acquire the base address from the descriptor queue address register in response to the trigger instruction being received, read a target descriptor in the first descriptor storage area based on the base address and the trigger instruction, read target data corresponding to the target descriptor from the first data storage area comprises:

acquiring the base address from the descriptor queue address register in response to the trigger instruction being received, and in response to determining the target descriptor storage area and the target data storage area are the first descriptor storage area and the first data storage area based on the first flag bit in the base address, reading the target descriptor in the first descriptor storage area based on the base address and the trigger instruction, and reading the target data corresponding to the target descriptor from the first data storage area.

8. The network card device as claimed in claim 6, wherein the network data processing module, further configured to acquire the base address from the descriptor queue address register in response to the trigger instruction being received, and in response to determining the target descriptor storage area and the target data storage area are the second descriptor storage area and the second data storage area based on the first flag bit in the base address, read the target descriptor in the second descriptor storage area based on the base address and the trigger instruction, and read the target data corresponding to the target descriptor from the second data storage area.

9. The network card device as claimed in claim 6, wherein determine a target descriptor storage area and a target data storage area based on the first flag bit comprises:

in response to the first flag bit being a first preset value, determining that the target descriptor storage area is the first descriptor storage area, and the target data storage area is the first data storage area; and in response to the first flag bit being a second preset value, determining that the target descriptor storage area is the second descriptor storage area, and the target data storage area is the second data storage area.

10. The network card device as claimed in claim 1, wherein the base address comprises a first flag bit, the descriptor comprises a second flag bit, and a host memory of the host comprises a second descriptor storage area and a second data storage area;

the network data processing module, further configured to determine a target descriptor storage area and a target data storage area based on the first flag bit and the second flag bit, to read the target descriptor from the target descriptor storage area and read the target data corresponding to the target descriptor from the target data storage area, wherein the target descriptor storage area is the first descriptor storage area or the second descriptor storage area, and the target data storage area is the first data storage area or the second data storage area.

11. The network card device as claimed in claim 10, wherein acquire the base address from the descriptor queue address register in response to the trigger instruction being received, read a target descriptor in the first descriptor storage area based on the base address and the trigger instruction, read target data corresponding to the target descriptor from the first data storage area comprises:

acquiring the base address from the descriptor queue address register in response to the trigger instruction being received, in response to determining the target descriptor storage area is the first descriptor storage area based on the first flag bit in the base address, reading the target descriptor in the first descriptor storage area based on the base address and the trigger instruction, in response to determining the target data storage area is the first data storage area based on the second flag bit in the target descriptor, reading the target data corresponding to the target descriptor from the first data storage area.

12. The network card device as claimed in claim 10, wherein the network data processing module, further configured to acquire the base address from the descriptor queue address register in response to the trigger instruction being received, in response to determining the target descriptor storage area is the second descriptor storage area based on the first flag bit in the base address, read the target descriptor in the second descriptor storage area based on the base address and the trigger instruction and in response to determining the target data storage area is the first data storage area based on the second flag bit in the target descriptor, read the target data corresponding to the target descriptor from the first data storage area.

13. The network card device as claimed in claim 10, wherein the network data processing module, further configured to acquire the base address from the descriptor queue address register in response to the trigger instruction being received, in response to determining the target descriptor storage area is the second descriptor storage area based on the first flag bit in the base address, read the target descriptor in the second descriptor storage area based on the base address and the trigger instruction and in response to determining the target data storage area is the second data storage area based on the second flag bit in the target descriptor, read the target data corresponding to the target descriptor from the second data storage area.

14. The network card device as claimed in claim 10, wherein the network data processing module, further configured to acquire the base address from the descriptor queue address register in response to the trigger instruction being received, in response to determining the target descriptor storage area is the first descriptor storage area based on the first flag bit in the base address, read the target descriptor in the first descriptor storage area based on the base address and the trigger instruction and in response to determining the target data storage area is the second data storage area based on the second flag bit in the target descriptor, read the target data corresponding to the target descriptor from the second data storage area.

15. The network card device as claimed in claim 10, wherein determine a target descriptor storage area and a target data storage area based on the first flag bit and the second flag bit comprises:

in response to the first flag bit being a first preset value, determining that the target descriptor storage area is the first descriptor storage area;

in response to the first flag bit being a second preset value, determining that the target descriptor storage area is the second descriptor storage area;

in response to the second flag bit being a third preset value, determining that the target data storage area is the first data storage area; and in response to the second flag bit being a fourth preset value, determining that the target data storage area is the second data storage area.

16. The network card device as claimed in claim 1, wherein the descriptor comprises a data address and a data length, wherein the data address of the descriptor in the first descriptor storage area is a physical address inside the storage module, which is calculated based on a global physical address.

17. The network card device as claimed in claim 1, further comprising:

a memory mapping configuration module, configured to store the number of transmit/receive queues and the number of interrupts supported by the network data processing module;

the compute express link hard core module, configured to transmit the number of transmit/receive queues and the number of interrupts to the host to make the host partition the first data storage area and the first descriptor storage area in the storage module based on the number of transmit/receive queues and the number of interrupts.

18. The network card device as claimed in claim 1, the network card device further comprising:

a mode enable register, configured to store a function trigger value;

the compute express link hard core module, further configured to transmit the function trigger value sent by the host to the mode enable register; and in response to the function trigger value being a fifth preset value, the network data processing module is disabled, and in response to the function trigger value being a sixth preset value, the network data processing module is enabled.

19. A data transmission system, comprising:

a host, configured to send data, a descriptor, and a trigger instruction; and at least one network card device, the at least one network card device comprises:

a storage module, the storage module comprises a first descriptor storage area and a first data storage area;

a descriptor queue address register, configured to store a base address of the first descriptor storage area;

a compute express link hard core module, configured to receive data and a descriptor sent by a host through a compute express link memory protocol, receive a trigger instruction sent by the host through a compute express link enumeration configuration protocol, transmit the data sent by the host to the first data storage area, transmit the descriptor sent by the host to the first descriptor storage area, and transmit the trigger instruction sent by the host to a network data processing module; and the network data processing module, configured to acquire the base address from the descriptor queue address register in response to the trigger instruction being received, read a target descriptor in the first descriptor storage area based on the base address and the trigger instruction, read target data corresponding to the target descriptor from the first data storage area, and output the target data to a network.

20. The data transmission system as claimed in claim 19, wherein the host is further configured to perform an initialization operation on the network card device when connected to the network card device.

* * * * *